(12) United States Patent
Zhang et al.

(10) Patent No.: US 11,441,357 B2
(45) Date of Patent: Sep. 13, 2022

(54) DRILLING PLATFORM FOR AMPHIBIOUS OPERATIONS

(71) Applicant: SOUTHWEST PETROLEUM UNIVERSITY, Sichuan (CN)

(72) Inventors: Junwei Zhang, Sichuan (CN); Liang Guo, Sichuan (CN); Chun Pei, Sichuan (CN); Ziwei Xiao, Sichuan (CN); Mingwei Liao, Sichuan (CN); Baoquan Wang, Sichuan (CN); Deliang Qian, Sichuan (CN); Youjun Ji, Sichuan (CN); Jiao Zhu, Sichuan (CN); Hui Guo, Sichuan (CN)

(73) Assignee: SOUTHWEST PETROLEUM UNIVERSITY, Sichuan (CN)

( * ) Notice: Subject to any disclaimer, the term of this patent is extended or adjusted under 35 U.S.C. 154(b) by 441 days.

(21) Appl. No.: 16/581,768

(22) Filed: Sep. 25, 2019

(65) Prior Publication Data

US 2020/0018121 A1 Jan. 16, 2020

(30) Foreign Application Priority Data

Jan. 11, 2019 (CN) .......................... 201910025509.4

(51) Int. Cl.
*E21B 7/02* (2006.01)
*E21B 15/00* (2006.01)
*B60F 3/00* (2006.01)
*B60S 9/12* (2006.01)
*E21B 7/136* (2006.01)

(52) U.S. Cl.
CPC .............. *E21B 7/02* (2013.01); *B60F 3/0015* (2013.01); *B60F 3/0038* (2013.01); *B60F 3/0061* (2013.01); *B60S 9/12* (2013.01); *E21B 7/136* (2013.01); *E21B 15/006* (2013.01)

(58) Field of Classification Search
CPC .......... E21B 7/02; E21B 7/136; E21B 15/006; B60F 3/0015; B60F 3/0038; B60F 3/0061; B60S 9/12
See application file for complete search history.

(56) References Cited

U.S. PATENT DOCUMENTS 2,981,221 A * 4/1961 Gillois .................. B60F 3/0038
440/12.54
2008/0296063 A1* 12/2008 Marshman .............. E21B 19/15
175/58

FOREIGN PATENT DOCUMENTS

CN 104386215 A * 3/2015
CN 108674105 A * 10/2018

* cited by examiner

*Primary Examiner* — Matthew R Buck

(57) ABSTRACT

A drilling platform for amphibious operations includes: a base, wherein drive tracks are arranged on both sides of the base, a propeller is disposed at a rear end of the base, and a driving assembly is disposed inside the base; two support cylinders are respectively disposed at two ends of the base; each of the support cylinders contains a sub-cylinder; a pushing cylinder is arranged on a bottom surface of the partition plate; a buoyancy adjustment assembly is provided at a bottom of the base, so as to provide buoyancy support for the base when the base is transferred from land to water. The present invention is suitable for drilling construction of pile foundations of water and land buildings, bridge piers, and transmission line electric tower pile foundations, as well as drilling of oil wells, wherein the drilling platform construction process at different drilling points is omitted.

14 Claims, 5 Drawing Sheets

DRILLING PLATFORM FOR AMPHIBIOUS OPERATIONS

CROSS REFERENCE OF RELATED APPLICATION

The present invention claims priority under 35 U.S.C. 119(a-d) to CN 201910025509.4, filed Jan. 11, 2019.

BACKGROUND OF THE PRESENT INVENTION

Field of Invention

The present invention relates to a technical field of construction equipment such as basic engineering drilling and petroleum engineering drilling, and more particularly to a drilling platform for amphibious operations.

Description of Related Arts

The scale of modern engineering construction has been continuously expanded, and a large number of large-scale engineering projects such as super high-rise buildings and large-span bridges have emerged. The pile foundation supporting these giants is their most important foundation. The reverse circulation drilling rig is applied to large-caliber super-depth pile foundations on large-scale buildings on land, complex formations such as hard rock layers, pile foundation construction of port wharf, construction of embankment protection piles and construction of bridge pile foundations in rivers, lakes and seas. However, for areas with relatively special geological conditions, such as soft soil areas such as lake floodplains, marine deltas and shallow water beaches with no access, ordinary reverse circulation drilling rigs cannot travel to the predetermined hole area to carry out normal drilling operations. Furthermore, when encountering a water working environment with a depth of more than ten meters, the ordinary reverse circulation drilling rig seems to be at a loss, and only by rebuilding a complicated and professional drilling platform can the implementation of the corresponding drilling process be maintained. In addition, in the field of geological exploration or in the erection of bridges, electric towers, etc., the number of holes to be drilled is often measured in rows or batches. As we all know, the construction of conventional large and medium-sized drilling platforms requires a lot of manpower, financial resources and material resources. For the above engineering field, if points are close to each other but a large number of holes are needed, the platform equipment has to be repeatedly removed and installed to complete the transfer of the work site. Such cumbersome repetitive process seriously reduces the efficiency of the work while greatly increasing the construction cost. Therefore, it is urgent to develop a drilling platform for amphibious operations, so as to realize the whole machine transfer in the above special working area (especially for floating transfer in the water area), and realize the seamless connection of adjacent drilling construction period, so as to greatly shorten the construction period and significantly reduce the project cost.

SUMMARY OF THE PRESENT INVENTION

An object of the present invention is to provide a drilling platform for amphibious operations to overcome the above defects.

Accordingly, in order to accomplish the above objects, the present invention provides:

a drilling platform for amphibious operations, comprising: a base and an operating platform fixed on the base for drilling, wherein drive tracks are arranged on both sides of the base, a propeller is disposed at a rear end of the base, and a driving assembly is disposed inside the base to respectively cooperate with the drive tracks and the propeller; two support cylinders are respectively disposed at two ends of the base, and bottom ends of the support cylinders penetrate the base to be flush with a bottom surface of the base; each of the support cylinders contains a sub-cylinder coaxial therewith; a bottom end of the sub-cylinder is sealed, and a partition plate for isolating the sub-cylinder into two separate regions is mounted on an internal circumferential wall of the sub-cylinder; a pushing cylinder is arranged on a bottom surface of the partition plate; a circular sealing organ cover is arranged on the internal circumferential wall of the sub-cylinder, and a small-diameter open end of the sealing organ cover is connected to a middle of an output end of the pushing cylinder; a follower plate is mounted at an end portion of the output end of the pushing cylinder; a plurality of sliding slots are provided on an external circumferential wall at a bottom end along a circumferential direction of the sub-cylinder, and a plurality of grooves are formed on the internal circumferential wall of the bottom end along the circumferential direction of the sub-cylinder; longitudinal sections of the grooves are right-angled triangles, and bottoms of the grooves communicate with the sliding slots; a plurality of linkage rods are fixed on a bottom surface of the follower plate, and a bottom of each of the linkage rods is respectively hinged with an anchor claw; a bottom end of the anchor claw extends downwardly along oblique sides of the grooves into the sliding slots; when the output end of the pushing cylinder extends to a maximum stroke, bottom ends of the linkage rods are completely moved out of the sliding slots; while external sidewalls of the linkage rods contact with the oblique sides of the grooves, the internal sidewalls of the linkage rods contact with the internal walls of the sliding slots; a buoyancy adjustment assembly is provided at a bottom of the base, so as to provide buoyancy support for the base when the base is transferred from land to water. In view of utilization restrictions of conventional drilling rigs, the applicant designed a drilling platform for amphibious operations, which is suitable for drilling construction of pile foundations of water and land buildings, bridge piers, and transmission line (if passing through crab pond, floodplain, swamp and pond) electric tower pile foundations, as well as drilling of oil wells, wherein the drilling platform construction process at different drilling points is omitted, and the operating platform can be switched between amphibious geographical environments, thereby improving the flexibility of the drilling platform and reducing the construction cost.

In practice, for different geographical environments such as land drilling, the operating platform is moved to a drilling point by the drive tracks, and then the sub-cylinder in the support cylinder at both ends of the base is quickly moved down and cuts into the ground with a certain depth. At the same time, the pushing cylinder is started to expend the anchor claw outwardly along an axis of the sub-cylinder, so to improve the stability of the base and the operating platform during construction. The operating platform is provided with a corresponding drilling equipment, and a through hole is reserved in the middle of the base to lower or take out the drill rod or cylindrical support member. When the drilling environment is switched from land to water environment, especially areas with a water depth of no more than 10 m such as shoal, crab pond, floodplain, swamp and pond, the drive tracks drive the base and the operating platform to a water-land boundary area. At this time, the buoyancy adjustment assembly at the bottom of the base is manually activated. That is to say, the buoyancy adjustment assembly first supports a part of the base which first enters the water, and the buoyancy adjustment assembly is completely expanded when the base is completely immerged in water, so as to provide buoyancy to the base and the operating platform. Meanwhile, the driving power of the base is switched from the drive tracks to driving devices for water such as a propeller-like driving device until the base and the operating platform are moved to a drilling point of the water. Then the four sub-cylinders are simultaneously driven downward to pass through the mud at the bottom of the water and contact with a hard formation at the bottom. The pushing cylinder is then started, so that the follower plate, the linkage rod, and the anchor claw are moved down until the anchor claw is in contact with the hard formation. The sealing organ cover at the bottom of the sub-cylinder separates the pushing cylinder from the outside, preventing external water or mud from affecting the normal operation of the pushing cylinder. When the four sub-cylinders are fully fixed, the drilling process can begin. It should be further noted that the sub-cylinder can be directly recovered after the drilling process of the water area, which means free telescopic movement can be achieved. Furthermore, when the bottom of the sub-cylinder reaches a designated fixing position at the bottom of the water, a top end of the sub-cylinder can be fixed by a bolt or pin, thereby integrating the sub-cylinder, the support cylinder and the base to improve the stability of the base.

The driving assembly comprises four active motors, and the base is internally provided with a plurality of support plates; one end of a power output shaft movably penetrates a top of the support plate, and the other end of the power output shaft movably penetrates a sidewall of the base and is connected to a driving wheel of the drive track; an active wheel is mounted on an output shaft of the active motor, and a driven wheel, which is connected to the active wheel via a belt, is mounted on the power output shaft; two clapboards are provided in a middle of the base, and an independent interval is formed and sealed between the two clapboards; the four active motors are all disposed in the independent interval; the driving assembly further comprises two driving shafts, one ends of the driving shafts are rotatably disposed in the base, and the other ends of the driving shafts movably penetrate the base and extend outwardly; the propeller is arranged on an extended section of each of the driving shafts; a plurality of supports are arranged on the internal wall at the bottom of the base, and an up-push cylinder is provided on each of the supports; an output end of the up-push cylinder is provided with a support base, and a driving motor is horizontally disposed on the support base; a driving gear is mounted at an output end of the driving motor, and linkage gears cooperating with the driving gear are mounted on the driving shafts. Preferably, the driving assembly needs to enable amphibious construction environment switch of the base and the operating platform, which means the drive track and the propeller of the driving assembly can realize a power output switching function. In practice, a plurality of the active motors are disposed inside the base, and are coupled with the driving shaft through cooperation of the active wheel, the belt and the driven wheel. The driving shaft is engaged with the driving wheel of the drive track for normal driving. Driving of the drive tracks and driving of the propeller are independent. When entering the water area, the active motor is stopped, and the up-push cylinder is started to move up the support base until the driving gear at the output end of the driving motor cooperates with the linkage gear, thereby driving the propeller to rotate, which means the base and the operating platform can move normally. The operating platform can be moved conveniently and freely on both land and water topographies through switching between or cooperation of the drive tracks and the propeller.

A sleeve is disposed in a middle of the operating platform for a drill rod to pass through, the sleeve penetrates the base to be flush with the bottom of the base, and the sleeve is placed in the independent interval formed by the two clapboards; a drill rod adjusting mechanism is provided at a top of the sleeve, comprising a limiting cylinder and a fixing cylinder coaxial with the limiting cylinder, wherein the fixing cylinder is placed in the limiting cylinder, and two bearings are arranged on an internal circumferential wall of the fixing cylinder; a connecting rod penetrates the fixing cylinder and cooperates with the two bearings; a drill rod joint is fixed at one end of the connecting rod, and a transmission gear is connected to the other end of the connecting rod; a fixing plate is provided on an internal wall of the limiting cylinder, and an end plate is disposed on an external circumferential wall of the limiting cylinder; an adjusting shaft is disposed inside the limiting cylinder, whose external circumferential wall is respectively provided with a driven auxiliary gear and a driven gear; an active gear cooperating with the driven gear is further provided inside the limiting cylinder; a toothed belt is provided on an external circumferential wall of the fixing cylinder along an axis thereof to cooperate with the driven auxiliary gear; a screw hole is drilled in a middle of the end plate, and a screw penetrates the end plate and extends into the limiting cylinder; a bearing is mounted on an extended end of the screw; a handle is mounted on an external end of the screw; one end of the adjusting shaft is connected to the bearing, and a spring facing the fixing plate is fixed on the other end of the adjusting shaft. Preferably, when the operating platform performs the drilling process, the drill bit and the drill rod begin to move downward through the sleeve. During a drill bit drilling process, the drill rod needs to be continually replaced or the position of the drill bit needs to be adjusted in real-time. Therefore, the applicant designed the drill rod adjusting mechanism, comprising the limiting cylinder and the fixing cylinder coaxial with the limiting cylinder, so as to speed up the replacement of the drill rod or the position adjustment of the drill bit by lifting and lowering the fixing cylinder. In practice, the limiting cylinder is fixed on the operating platform, and the fixing cylinder is placed inside the limiting cylinder. The adjusting shaft can move along an axis thereof by rotating the handle, so that the driven auxiliary gear is engaged with the toothed belt on the external wall of the fixing cylinder. Then an external driving output element is started to drive the active gear to cooperate with the driven gear. The adjusting shaft starts to rotate for lifting and lowering the fixing cylinder. The drill rod joint is fixed at one end of the fixing cylinder, which is connected to the drill rod, so that the drill pipe or drill bit can be lifted or lowered with the fixing cylinder. It should be noted that the adjusting shaft is connected to the fixing plate through the spring, which means that during adjusting the fixing cylinder, the spring can eliminate the impact force generated by the fixing cylinder during the lifting and lowering process due to swing, so as to reduce wear between the toothed belt and the driven auxiliary gear.

The buoyancy adjusting assembly comprises two airbags I and one airbag II, wherein two rectangular slots I are respectively provided on both sides at the bottom of to the base, and a rectangular slot II is provided at a middle of the bottom of the base; the airbags I are folded and placed in the rectangular slots I, and the airbag II is folded and placed in the rectangular slot II; three inflating mechanisms are provided inside the base, each comprising a fan, a booster pump and a gas pipe, wherein the booster pump is disposed on the gas pipe, one end of the gas pipe communicates with a gas outlet of the fan, and the other end of the gas pipe is connected to the airbags I after penetrate the base; the airbags I are inflated and expanded into a U shape, and internal vertical sections of the airbags I are placed in the rectangular slots I; a distance between a sidewall of the base and the rectangular slots I on a same side is L, a distance between the two vertical sections of the airbags I is R, and R≥L; the airbag II is inflated and expanded into a T shape, and a vertical section of the airbag II is located in the rectangular slot II. Preferably, since size and weight of the base and the operating platform of the present invention are not the same level as the conventional offshore drilling platform, and belong to the small drilling devices, the overall weight of the drilling platform is relatively small. When the base is immersed in water, the buoyancy generated is insufficient to maintain a floating state, so the buoyancy adjusting mechanism acts as an auxiliary buoyancy lifting device for the drilling platform to move on the water surface. The two airbags I and the airbag II are fully expanded to supply enough buoyancy of the base and the operating platform, ensuring that the base can float on the water surface as a ship to facilitate the normal movement of the drilling platform. When used on land, the airbags I and the airbag II are respectively compressed and folded in the rectangular slot I and the rectangular slot II; when the water and land environment is switched, the fan and the booster pump corresponding to the airbags I and the airbag II are simultaneously activated, so that the airbags I and the airbag II are inflated and then expanded. The airbags I are U-shaped after being fully expanded, and internal vertical sections of the airbags I are placed in the rectangular slots I; the distance between the sidewall of the base and the rectangular slots I on the same side is L, the distance between the two vertical sections of the airbags I is R, and R≥L, so that the airbags I can wrap corners at both sides at the bottom of the base to provide sufficient buoyancy for both sides of the base. The airbag II is T-shaped after being inflated and expanded, and the vertical section of the airbag II is located in the rectangular slot II; a horizontal section of the airbag II is directly in contact with the water surface to provide sufficient buoyancy for the middle of the base. The airbags I and the airbag II cooperate with each other to ensure that the base is stabilized on the water surface together with the buoyance of the immersed base, thereby ensuring the stability of the base before lowering the sub-cylinder. The airbags I and the airbag II can be deflated when the bottom of the sub-cylinder contacts the hard ground layer and anchored, wherein the deflated airbags I and the deflated airbag II can buffer the force generated by the water body against the base, so as to improve the stability of the base and the operating platform when in use.

A plurality of loops I are provided on external surfaces of the airbags I, and a plurality of loops II are provided on an external surface of the airbag II; a winding motor I and a winding motor II are provided inside the base; a winding roller I and a winding roller II are respectively arranged at an output end of the winding motor I; an external diameter of the winding roller II is larger than an external diameter of the winding roller I; a winding roller III is provided at an output end of the winding motor II, and one traction rope I is connected to the winding roller II after passing through all the loops I on external sidewalls of the airbags I, and another traction rope I is connected to the winding roller I after passing through all the loops I on an internal sidewall of the airbags I; a traction rope II is connected to the winding roller III after passing through the loops II. When the initial state or the drilling process is completed, the airbags I and the airbag II will be respectively folded into the rectangular slots I and the rectangular slot II. When the airbags I or the airbag II is recovered, they cannot be completely stored in the slots only by sucking with the fan. Therefore, the applicant designed a plurality of loops I on external surfaces of the airbags I, and a plurality of loops II are provided on an external surface of the airbag II. Since the airbags I are U-shaped after being inflated and expanded, one traction rope I is connected to the winding roller I in the base after passing through the loops I on the internal sidewall of the airbags I, and another traction rope I is connected to the winding roller II in the base after passing through the loops I on external sidewalls of the airbags I, wherein an external diameter of the winding roller II is larger than an external diameter of the winding roller I, which external surface areas of the U-shaped airbags I are obviously larger than internal surface areas thereof. Therefore, under the premise of stable output at the output end of the winding motor I, angular speeds of the winding roller I and the winding roller II are the same, and linear velocities of the two are related to their own radius. With the foregoing structure, both sides of the airbags I can be simultaneously stored into the rectangular slots I after being deflated, thereby reducing the occurrence of the airbags I being partially outside the rectangular slots I during the winding process. The airbag II is T-shaped, and vertical section thereof divides the horizontal sections equally, so surfaces area on both sides of the airbag II are the same. As a result, the loops II on both sides of the airbag II are respectively connected in series by the two traction ropes II, so that the airbag II can be quickly wound up in the rectangular slot II after the winding motor II is started.

L-shaped plates are respectively disposed at two right-angle joints where the external vertical sections and horizontal sections of the airbags I intersect with each other, and the L-shaped plates are made of an elastic rubber material. Preferably, the L-shaped plates are respectively disposed at two right-angle joints where the external vertical sections and horizontal sections of the airbags I intersect with each other, so that the L-shaped plates of the airbags I can guide external portions of the airbags I to quickly return to the U shape after being inflated. As a result, during the inflation process, the external portions of the airbags I will not be pressed at the bottom of the base, ensuring that the airbags I quickly and completely wrap the bottom and the two sides of the base, thereby improving the external surface areas of the airbags I while ensuring sufficient buoyancy generated by the airbags I to support the base.

Two oppositely disposed cavities are formed on internal sidewalls of the rectangular slots I and the rectangular slot II, and the cavities are provided with driving cylinders therein; rectangular through holes are drilled on walls of the cavities to communicate with the rectangular slots I; sealing plates are arranged at output ends of the driving cylinders, wherein the driving cylinders are turned on until opposite end faces of the two sealing plates contact with each other to achieve closure of the bottom ends of the rectangular slots I. Preferably, since the drilling platform often switches between the land environment and the water environment, the rectangular slots I and the rectangular slot II may have wading conditions, and long-term immersion may cause corrosion and microorganism adhesion of the airbags I or the airbag II, which is extremely easy to reduce the service life of the airbags. Therefore, the applicant designed two oppositely disposed cavities on the internal sidewalls of the rectangular slots I and the rectangular slot II, and the cavities are provided with the driving cylinders therein; rectangular through holes are drilled on walls of the cavities to communicate with the rectangular slots I or the rectangular slot II; the sealing plates are arranged at the output ends of the driving cylinders. When the airbags are recovered, the driving cylinders are turned on until opposite end faces of the two sealing plates contact with each other to achieve closure of the bottom ends of the rectangular slots I or the rectangular slot II. It should be further noted that the rectangular slots I and the rectangular slot II have identical depths, the only difference is that the width of the rectangular slot II is larger than the width of the rectangular slots I. As a result, the inflating mechanisms corresponding to the airbags I or the airbag II are identical, and the bottom end closure mechanisms corresponding to the rectangular slots I and the rectangular slot II are also identical, each comprises two cavities, two driving cylinders, two rectangular through holes, and two sealing plates.

Among the rectangular slots I, two protrusions are respectively provided on the opposite end faces of the two sealing plates, and the two protrusions are fitted to each other. Preferably, the two engaged protrusions can increase the contact area of the two sealing plates, so as to better isolate the rectangular slots I or the rectangular slot II from the outside.

A height of the horizontal sections of the airbags I after inflation and expansion is H, a height of a horizontal section of the airbag II after inflation and expansion is G, and H<G<2H. Preferably, when the base is in a water environment, an immersion depth of the horizontal section of the airbag II after being inflated and expanded is greater than immersion depths of the horizontal sections of the airbags I after being inflated and expanded. When the drilling platform is placed above the water, a gravity center thereof is in the middle of the base. Therefore, as a main supporting member, a volume of the airbag II should be larger than volumes of the airbags I. Furthermore, the height of the horizontal sections of the airbags I after inflation and expansion is H, the height of the horizontal section of the airbag II after inflation and expansion is G, and H<G<2H, so that a floating area at the bottom of the base is sufficient to meet the requirements of movement and drilling construction of the drilling platform.

A drilling rig, a control room, a sleeve bracket, a drill joint bracket, a drill joint bracket, a boom and two hangers are disposed on the operating platform, wherein the drilling rig is located in a middle of the operating platform, and the two hangers are respectively located at two ends of the operating platform. Preferably, the drilling rig, the control room, the sleeve bracket, the drill joint bracket, the drill joint bracket, the boom and the two hangers are disposed on the operating platform, in such a manner that a drill bit and the drill rod can be lowered and replaced normally while it is convenient to assist fixing the base. Furthermore, the two hangers at both ends of the operating platform can support the sub-cylinder during lifting and lowering.

Compared with the prior art, the present invention has the following advantages and beneficial effects:

1. The present invention provides a drilling platform for amphibious operations, which is suitable for drilling construction of pile foundations of water and land buildings, bridge piers, and transmission line (if passing through crab pond, floodplain, swamp and pond) electric tower pile foundations, as well as drilling of oil wells, wherein the drilling platform construction process at different drilling points is omitted, and the operating platform can be switched between amphibious geographical environments, thereby improving the flexibility of the drilling platform. Furthermore, the construction of conventional large and medium-sized drilling platforms requires a lot of manpower, financial resources and material resources. For the above engineering field, if points are close to each other but a large number of holes are needed, the platform equipment has to be repeatedly removed and installed to complete the transfer of the work site. Such cumbersome repetitive process seriously reduces the efficiency of the work while greatly increasing the construction cost. The present invention realizes the whole machine transfer in the above special working area (especially for floating transfer in the water area), and realize the seamless connection of adjacent drilling construction period, so as to greatly shorten the construction period and significantly reduce the project cost.

2. The airbag II is T-shaped after being inflated and expanded, and the vertical section of the airbag II is located in the rectangular slot II; a horizontal section of the airbag II is directly in contact with the water surface to provide sufficient buoyancy for the middle of the base. The airbags I and the airbag II cooperate with each other to ensure that the base is stabilized on the water surface together with the buoyance of the immersed base, thereby ensuring the stability of the base before lowering the sub-cylinder.

BRIEF DESCRIPTION OF THE DRAWINGS

The drawings are intended to provide a further understanding of the embodiments of the present invention, and are not intended to limit the embodiments of the present invention.

ELEMENT REFERENCE

Figure 1:
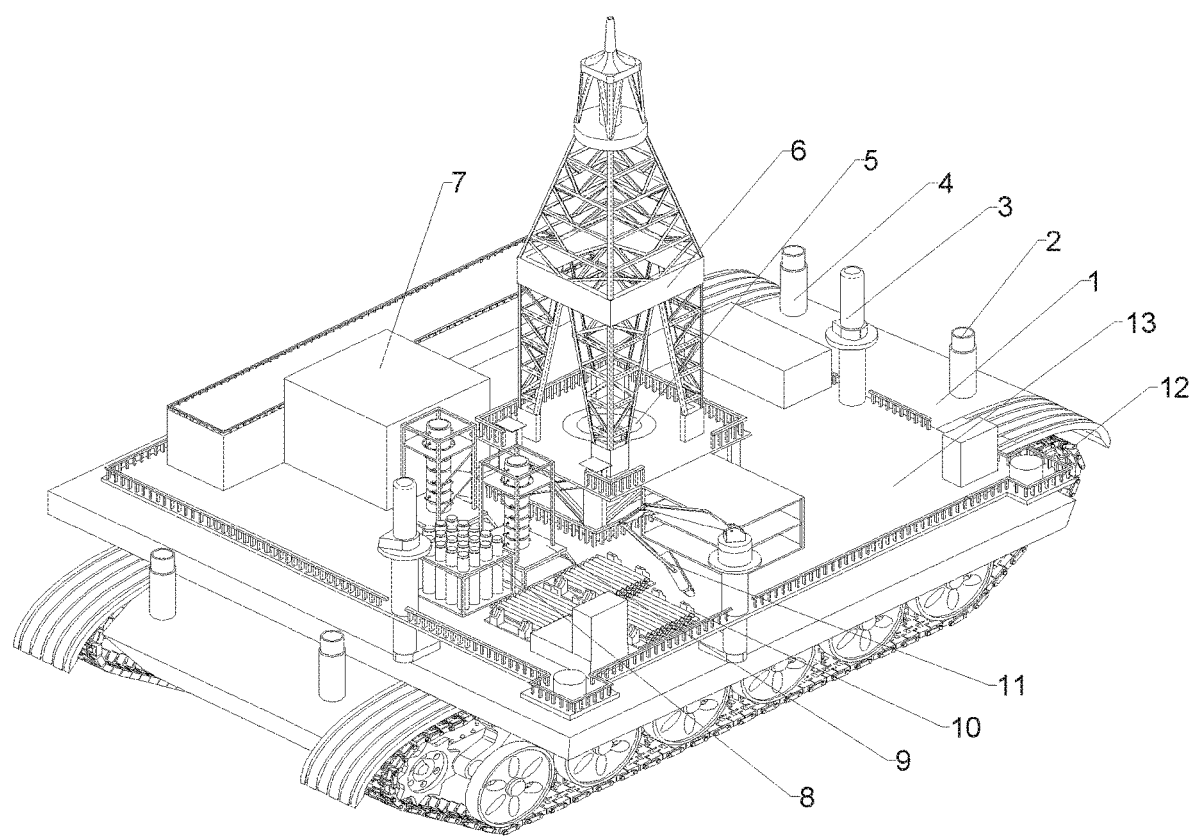
FIG. 1 is a structural view of the present invention.
Figure 2:
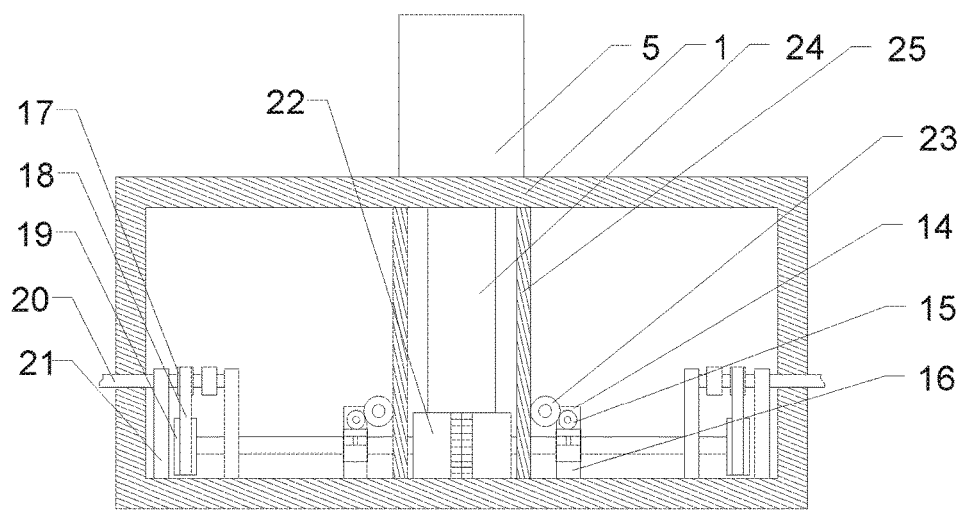
FIG. 2 is a longitudinal sectional view of a base.

1—base, 2—sub-cylinder, 201—partition plate, 202—pushing cylinder, 203—sealing organ cover, 204—follower plate, 205—linkage rod, 206—anchor claw, 207—groove, 208—sliding slot, 3—hanger, 4—support cylinder, 5—drill rod adjusting mechanism, 501—drill rod joint, 502—fixing plate, 503—spring, 504—adjusting shaft, 505—fixing cylinder, 506—transmission gear, 507—toothed belt, 508—active gear, 509—driven auxiliary gear, 510—driven gear, 511—end plate, 512—screw, 513—handle, 6—drilling rig, 7—control room, 8—sleeve bracket, 9—drill joint bracket, 10—drill joint bracket, 11—boom, 12—drive track, 13—operating platform, 14—driving motor, 15—driving gear, 16—support, 17—driven wheel, 18—belt, 19—active wheel, 20—power output shaft, 21—support plate, 22—active motor, 23—driving shaft, 24—sleeve, 25—clapboard, 26—fan, 27—booster pump, 28—gas pipe, 29—rectangular slot I, 30—airbag I, 31—sealing plate, 32—winding motor I, 33—winding roller I, 34—winding roller II, 35—airbag II, 36—rectangular slot II, 37—winding motor II, 38—winding roller III, 39—loop II, 40—traction rope II, 41—driving cylinder, 42—protrusion, 43—loop I, 44—traction rope I, 45—L-shaped plate.

DETAILED DESCRIPTION OF THE PREFERRED EMBODIMENT

In order to make the objects, technical solutions and advantages of the present invention more comprehensible, the present invention will be further described in detail below in conjunction with the embodiments and drawings. The illustrative embodiments of the present invention and the description thereof are merely illustrative and are not intended to be limiting.

Embodiment 1

Referring to FIGS. 1-5, the embodiment 1 comprises a drilling platform for amphibious operations, comprising: a base 1 and an operating platform 13 fixed on the base 1 for drilling, wherein drive tracks 12 are arranged on both sides of the base 1, a propeller is disposed at a rear end of the base 1, and a driving assembly is disposed inside the base 1 to respectively cooperate with the drive tracks 12 and the propeller; two support cylinders 4 are respectively disposed at two ends of the base 1, and bottom ends of the support cylinders 4 penetrate the base 1 to be flush with a bottom surface of the base 1; each of the support cylinders 4 contains a sub-cylinder 2 coaxial therewith; a bottom end of the sub-cylinder 2 is sealed, and a partition plate 201 for isolating the sub-cylinder 2 into two separate regions is mounted on an internal circumferential wall of the sub-cylinder 2; a pushing cylinder 202 is arranged on a bottom surface of the partition plate 201; a circular sealing organ cover 203 is arranged on the internal circumferential wall of the sub-cylinder 2, and a small-diameter open end of the sealing organ cover 203 is connected to a middle of an output end of the pushing cylinder 202; a follower plate 204 is mounted at an end portion of the output end of the pushing cylinder 202; a plurality of sliding slots 208 are provided on an external circumferential wall at a bottom end along a circumferential direction of the sub-cylinder 2, and a plurality of grooves 207 are formed on the internal circumferential wall of the bottom end along the circumferential direction of the sub-cylinder 2; longitudinal sections of the grooves 207 are right-angled triangles, and bottoms of the grooves 207 communicate with the sliding slots 208; a plurality of linkage rods 205 are fixed on a bottom surface of the follower plate 204, and a bottom of each of the linkage rods 205 is respectively hinged with an anchor claw 206; a bottom end of the anchor claw 206 extends downwardly along oblique sides of the grooves 207 into the sliding slots 208.

In practice, for different geographical environments such as land drilling, the operating platform 13 is moved to a drilling point by the drive tracks 12, and then the sub-cylinder 2 in the support cylinder 4 at both ends of the base 1 is quickly moved down and cuts into the ground with a certain depth. At the same time, the pushing cylinder 202 is started to expend the anchor claw 206 outwardly along an axis of the sub-cylinder 2, so to improve the stability of the base 1 and the operating platform 13 during construction. The operating platform 13 is provided with a corresponding drilling equipment, and a through hole is reserved in the middle of the base 1 to lower or take out the drill rod or cylindrical support member. When the drilling environment is switched from land to water environment, especially areas with a water depth of no more than 10 m such as shoal, crab pond, floodplain, swamp and pond, the drive tracks 12 drive the base 1 and the operating platform 13 to a water-land boundary area. At this time, the buoyancy adjustment assembly at the bottom of the base 1 is manually activated. That is to say, the buoyancy adjustment assembly first supports a part of the base 1 which first enters the water, and the buoyancy adjustment assembly is completely expanded when the base 1 is completely immersed in water, so as to provide buoyancy to the base 1 and the operating platform 13. Meanwhile, the driving power of the base 1 is switched from the drive tracks 12 to driving devices for water such as a propeller-like driving device until the base 1 and the operating platform 13 are moved to a drilling point of the water. Then the four sub-cylinders 2 are simultaneously driven downward to pass through the mud at the bottom of the water and contact with a hard formation at the bottom. The pushing cylinder 202 is then started, so that the follower plate 204, the linkage rod 205, and the anchor claw 206 are moved down until the anchor claw 206 is in contact with the hard formation. The sealing organ cover 203 at the bottom of the sub-cylinder 2 separates the pushing cylinder 202 from the outside, preventing external water or mud from affecting the normal operation of the pushing cylinder 202. When the four sub-cylinders 2 are fully fixed, the drilling process can begin.

It should be further noted that the sub-cylinder 2 can be directly recovered after the drilling process of the water area, which means free telescopic movement can be achieved. Furthermore, when the bottom of the sub-cylinder 2 reaches a designated fixing position at the bottom of the water, a top end of the sub-cylinder 2 can be fixed by a bolt or pin, thereby integrating the sub-cylinder 2, the support cylinder 4 and the base 1 to improve the stability of the base 1. The sealing organ cover 203 can isolate the pushing cylinder 202 from the outside to prevent the liquid or mud at the bottom of the water from affecting the operation of the pushing cylinder 202.

According to the embodiment 1, the driving assembly comprises four active motors 22, and the base 1 is internally provided with a plurality of support plates 21; one end of a power output shaft 20 movably penetrates a top of the support plate 21, and the other end of the power output shaft 20 movably penetrates a sidewall of the base 1 and is connected to a driving wheel of the drive track 12; an active wheel 19 is mounted on an output shaft of the active motor 22, and a driven wheel 17, which is connected to the active wheel 19 via a belt 18, is mounted on the power output shaft 20; two clapboards 25 are provided in a middle of the base 1, and an independent interval is formed and sealed between the two clapboards 25; the four active motors 22 are all disposed in the independent interval; the driving assembly further comprises two driving shafts 23, one ends of the driving shafts 23 are rotatably disposed in the base 1, and the other ends of the driving shafts 23 movably penetrate the base 1 and extend outwardly; the propeller is arranged on an extended section of each of the driving shafts 23; a plurality of supports 16 are arranged on the internal wall at the bottom of the base 1, and an up-push cylinder is provided on each of the supports 16; an output end of the up-push cylinder is provided with a support base, and a driving motor 14 is horizontally disposed on the support base; a driving gear 15 is mounted at an output end of the driving motor 14, and linkage gears cooperating with the driving gear 15 are mounted on the driving shafts 23. The driving assembly needs to enable amphibious construction environment switch of the base 1 and the operating platform 13, which means the drive track 12 and the propeller of the driving assembly can realize a power output switching function. In practice, a plurality of the active motors 22 are disposed inside the base 1, and are coupled with the driving shaft 23 through cooperation of the active wheel 19, the belt 18 and the driven wheel 17. The driving shaft 23 is engaged with the driving wheel of the drive track 12 for normal driving. Driving of the drive tracks 12 and driving of the propeller are independent. When entering the water area, the active motor 22 is stopped, and the up-push cylinder is started to move up the support base until the driving gear 15 at the output end of the driving motor 14 cooperates with the linkage gear, thereby driving the propeller to rotate, which means the base 1 and the operating platform 13 can move normally. The operating platform 13 can be moved conveniently and freely on both land and water topographies through switching between or cooperation of the drive tracks 12 and the propeller.

It should be noted that a drilling rig 6, a control room 7, a sleeve bracket 8, a drill joint bracket 9, a drill joint bracket 10, a boom 11 and two hangers 3 are disposed on the operating platform 13, in such a manner that a drill bit and the drill rod can be lowered and replaced normally while it is convenient to assist fixing the base 1. Furthermore, the two hangers 3 at both ends of the operating platform 13 can support the sub-cylinder 2 during lifting and failing. The above components are not fixed to the operating platform 13 when the drilling platform is switched between working environments, and are installed and fixed after the base 1 is moved to the drilling point. After the base 1 is fixed, a pumping grouting device and a pumping filtering device can be further installed on the operating platform 13, so that the operating platform 13 has multiple functions such as drilling holes, pumping and silting, and pouring piles, which is convenient for post-fixing the pile hole after forming.

Embodiment 2

Figure 3:
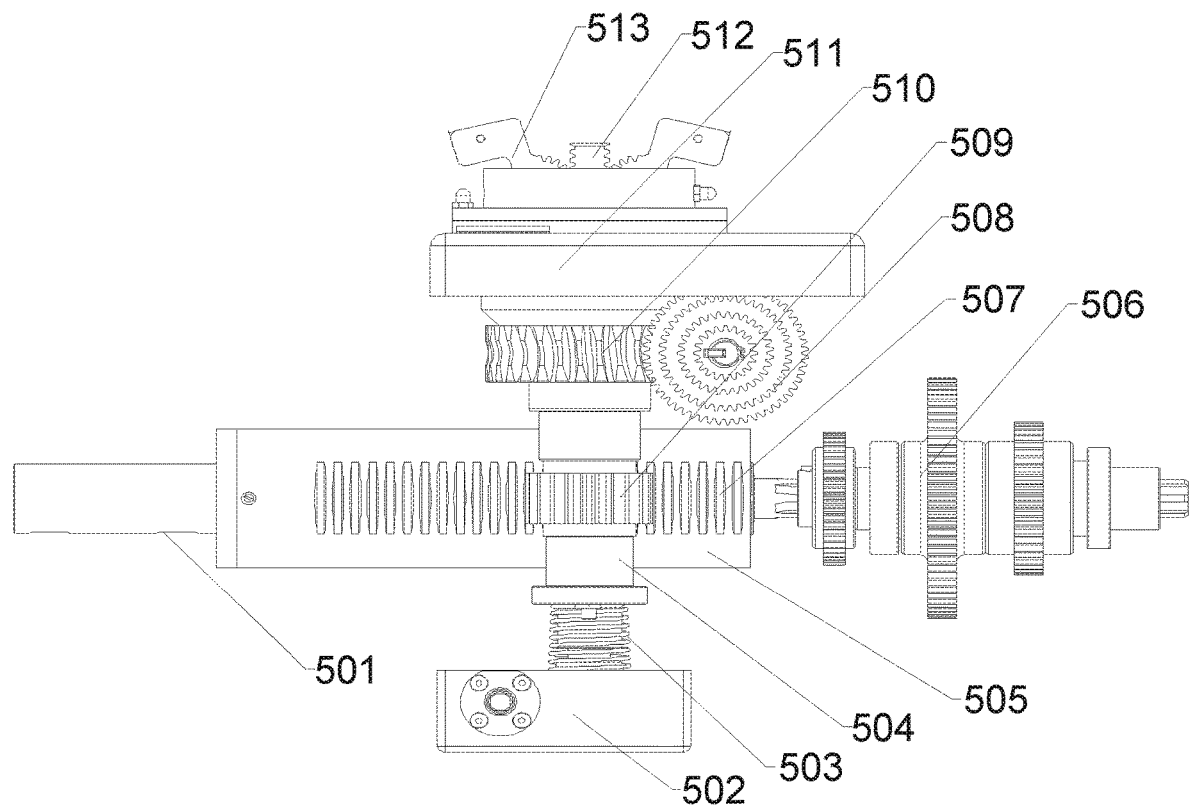
FIG. 3 is a structural view of a drill rod adjusting mechanism.
Figure 4:
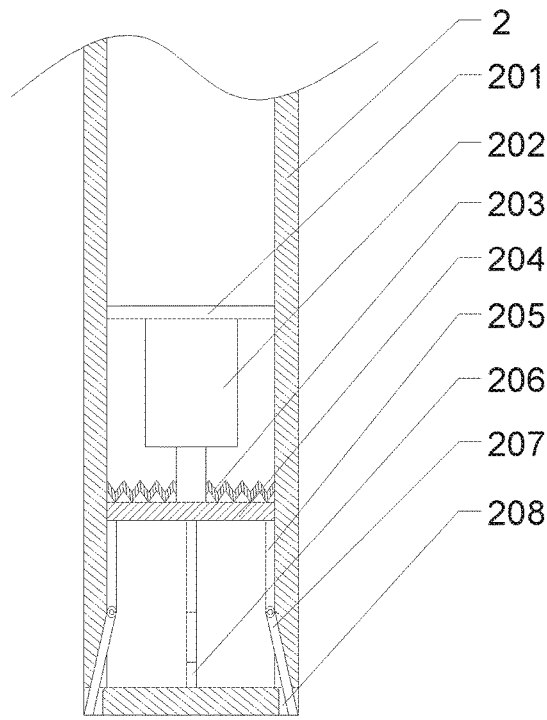
FIG. 4 is a schematic structural view of an initial state of a support assembly.
Figure 5:
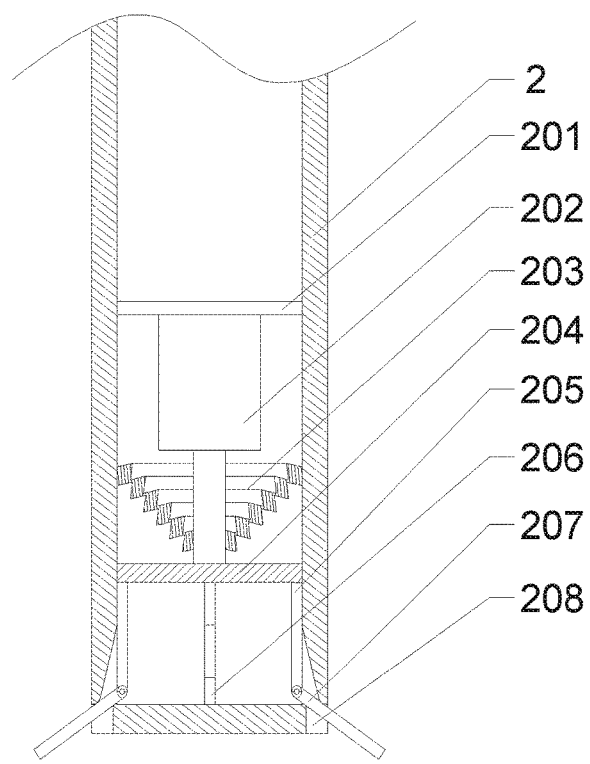
FIG. 5 is a structural view of an in-use state the support assembly.

Referring to FIG. 3, according to the embodiment 2, a sleeve 24 is disposed in a middle of the operating platform 13 for a drill rod to pass through, the sleeve 24 penetrates the base 1 to be flush with the bottom of the base 1, and the sleeve 24 is placed in the independent interval formed by the two clapboards 25; a drill rod adjusting mechanism 5 is provided at a top of the sleeve 24, comprising a limiting cylinder and a fixing cylinder 505 coaxial with the limiting cylinder, wherein the fixing cylinder 505 is placed in the limiting cylinder, and two bearings are arranged on an internal circumferential wall of the fixing cylinder 505; a connecting rod penetrates the fixing cylinder 505 and cooperates with the two bearings; a drill rod joint 501 is fixed at one end of the connecting rod, and a transmission gear 506 is connected to the other end of the connecting rod; a fixing plate 502 is provided on an internal wall of the limiting cylinder, and an end plate 511 is disposed on an external circumferential wall of the limiting cylinder; an adjusting shaft 504 is disposed inside the limiting cylinder, whose external circumferential wall is respectively provided with a driven auxiliary gear 509 and a driven gear 510; an active gear 508 cooperating with the driven gear 510 is further provided inside the limiting cylinder; a toothed belt 507 is provided on an external circumferential wall of the fixing cylinder 505 along an axis thereof to cooperate with the driven auxiliary gear 509; a screw hole is drilled in a middle of the end plate 511, and a screw 512 penetrates the end plate 511 and extends into the limiting cylinder; a bearing is mounted on an extended end of the screw 512; a handle 513 is mounted on an external end of the screw 512; one end of the adjusting shaft 504 is connected to the bearing, and a spring 503 facing the fixing plate 502 is fixed on the other end of the adjusting shaft 504.

When the operating platform 13 performs the drilling process, the drill bit and the drill rod begin to move downward through the sleeve 24. During a drill bit drilling process, the drill rod needs to be continually replaced or the position of the drill bit needs to be adjusted in real-time. The drill rod adjusting mechanism 5 comprises the limiting cylinder and the fixing cylinder 505 coaxial with the limiting cylinder, so as to speed up the replacement of the drill rod or the position adjustment of the drill bit by lifting and lowering the fixing cylinder 505. In practice, the limiting cylinder is fixed on the operating platform 13, and the fixing cylinder 505 is placed inside the limiting cylinder. The adjusting shaft 504 can move along an axis thereof by rotating the handle 513, so that the driven auxiliary gear 509 is engaged with the toothed belt 507 on the external wall of the fixing cylinder 505. Then an external driving output element is started to drive the active gear 508 to cooperate with the driven gear 510. The adjusting shaft 504 starts to rotate for lifting and lowering the fixing cylinder 505. The drill rod joint 501 is fixed at one end of the fixing cylinder 505, which is connected to the drill rod, so that the drill pipe or drill bit can be lifted or lowered with the fixing cylinder 505. It should be noted that the adjusting shaft 504 is connected to the fixing plate 502 through the spring 503, which means that during adjusting the fixing cylinder 505, the spring 503 can eliminate the impact force generated by the fixing cylinder 505 during the lifting and lowering process due to swing, so as to reduce wear between the toothed belt 507 and the driven auxiliary gear 509.

Embodiment 3

Figure 6:
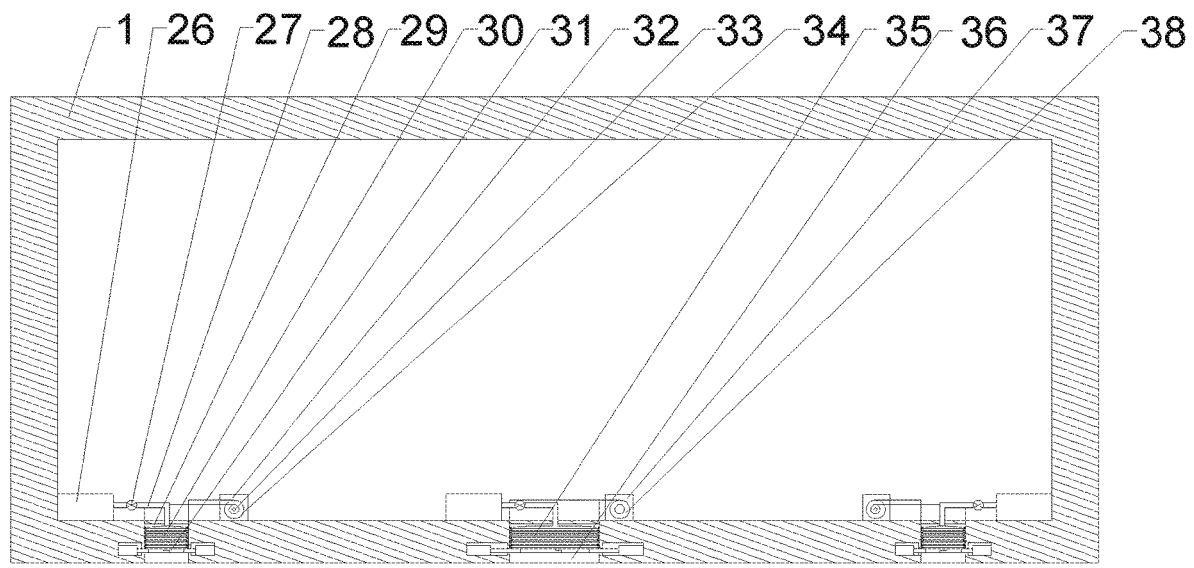
FIG. 6 is a structural view of an initial state of a buoyancy assembly.
Figure 7:
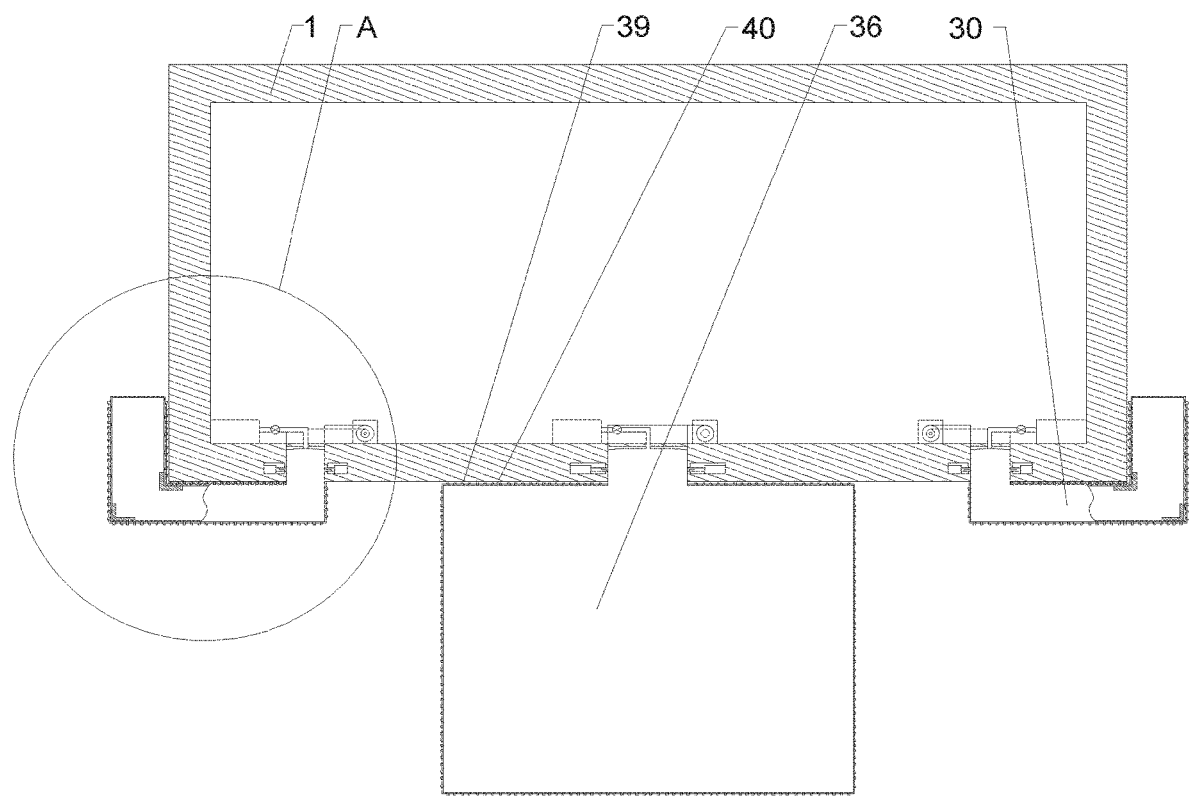
FIG. 7 is a structural view of an in-use state of the buoyancy assembly.
Figure 8:
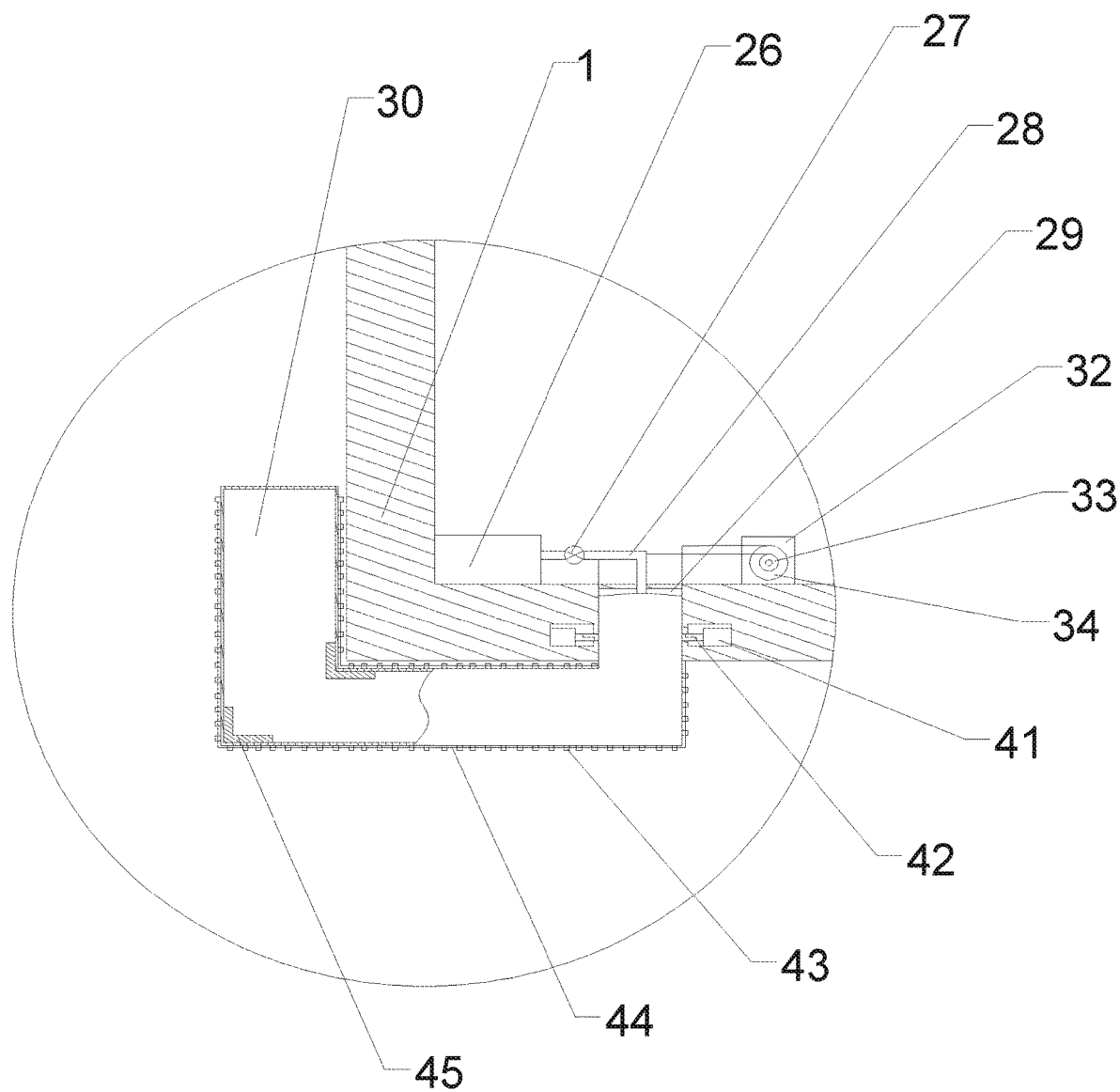
FIG. 8 is an enlarged view of a portion A in FIG. 7.

Referring to FIGS. 6-8, based on the embodiment 1, The buoyancy adjusting assembly comprises two airbags I 30 and one airbag II 35, wherein two rectangular slots I 29 are respectively provided on both sides at the bottom of the base 1, and a rectangular slot II 36 is provided at a middle of the bottom of the base 1; the airbags I 30 are folded and placed in the rectangular slots I 29, and the airbag II 35 is folded and placed in the rectangular slot II 36; three inflating mechanisms are provided inside the base 1, each comprising a fan 26, a booster pump 27 and a gas pipe 28, wherein the booster pump 27 is disposed on the gas pipe 28, one end of the gas pipe 28 communicates with a gas outlet of the fan 26, and the other end of the gas pipe 28 is connected to the airbags I 30 after penetrate the base 1; the airbags I 30 are inflated and expanded into a U shape, and internal vertical sections of the airbags I 30 are placed in the rectangular slots I 29; a distance between a sidewall of the base 1 and the rectangular slots I 29 on a same side is L, a distance between the two vertical sections of the airbags I 30 is R, and R≥L; the airbag II 35 is inflated and expanded into a T shape, and a vertical section of the airbag II 35 is located in the rectangular slot II 36. A plurality of loops I 43 are provided on external surfaces of the airbags I 30, and a plurality of loops II 39 are provided on an external surface of the airbag II 35; a winding motor I 32 and a winding motor II 37 are provided inside the base 1; a winding roller I 33 and a winding roller II 34 are respectively arranged at an output end of the winding motor I 32; an external diameter of the winding roller II 34 is larger than an external diameter of the winding roller I 33; a winding roller III 38 is provided at an output end of the winding motor II 37, and one traction rope I 44 is connected to the winding roller II 34 after passing through all the loops I 43 on external sidewalls of the airbags I 30, and another traction rope I 44 is connected to the winding roller I 33 after passing through all the loops I 43 on an internal sidewall of the airbags I 30; a traction rope II 40 is connected to the winding roller III 38 after passing through the loops II 39.

The use of the airbags I 30 and the airbag II 35 in the embodiment 3 comprises the following two cases:

when used on land, the airbags I 30 and the airbag II 35 are respectively compressed and folded in the rectangular slot I 29 and the rectangular slot II 36;

when the water and land environment is switched, the fan 26 and the booster pump 27 corresponding to the airbags I 30 and the airbag II 35 are simultaneously activated, so that the airbags I 30 and the airbag II 35 are inflated and then expanded. The airbags I 30 are U-shaped after being fully expanded, and internal vertical sections of the airbags I 30 are placed in the rectangular slots I 29; the distance between the sidewall of the base 1 and the rectangular slots I 29 on the same side is L, the distance between the two vertical sections of the airbags I 30 is R, and R≥L, so that the airbags I 30 can wrap corners at both sides at the bottom of the base 1 to provide sufficient buoyancy for both sides of the base 1. The airbag II 35 is T-shaped after being inflated and expanded, and the vertical section of the airbag II 35 is located in the rectangular slot II 36; a horizontal section of the airbag II 35 is directly in contact with the water surface to provide sufficient buoyancy for the middle of the base 1. The airbags I 30 and the airbag II 35 cooperate with each other to ensure that the base 1 is stabilized on the water surface together with the buoyance of the immersed base 1, thereby ensuring the stability of the base 1 before lowering the sub-cylinder 2. The airbags I 30 and the airbag II 35 can be deflated when the bottom of the sub-cylinder 2 contacts the hard ground layer and anchored, wherein the deflated airbags I 30 and the deflated airbag II 35 can buffer the force generated by the water body against the base 1, so as to improve the stability of the base 1 and the operating platform 13 when in use.

According to the embodiment 3, when the initial state or the drilling process is completed, the airbags I 30 and the airbag II 35 will be respectively folded into the rectangular slots I 29 and the rectangular slot II 36. When the airbags I 30 or the airbag II 35 is recovered, they cannot be completely stored in the slots only by only sucking with the fan 26. Therefore, the applicant designed a plurality of loops I 43 on external surfaces of the airbags I 30, and a plurality of loops II 39 are provided on an external surface of the airbag II 35. Since the airbags I 30 are U-shaped after being inflated and expanded, one traction rope I 44 is connected to the winding roller I 33 in the base 1 after passing through the loops I 43 on the internal sidewall of the airbags I 30, and another traction rope I 44 is connected to the winding roller II 34 in the base 1 after passing through the loops I 43 on external sidewalls of the airbags I 30, wherein an external diameter of the winding roller II 34 is larger than an external diameter of the winding roller I 33, which external surface areas of the U-shaped airbags I 30 are obviously larger than internal surface areas thereof. Therefore, under the premise of stable output at the output end of the winding motor I 32, angular speeds of the winding roller I 33 and the winding roller II 34 are the same, and linear velocities of the two are related to their own radius. With the foregoing structure, both sides of the airbags I 30 can be simultaneously stored into the rectangular slots I 29 after being deflated, thereby reducing the occurrence of the airbags I 30 being artially outside the rectangular slots I 29 during the winding process. The airbag II 35 is T-shaped, and vertical section thereof divides the horizontal sections equally, so surfaces area on both sides of the airbag II 35 are the same. As a result, the loops II 39 on both sides of the airbag II 35 are respectively connected in series by the two traction ropes II 40, so that the airbag II 35 can be quickly wound up in the rectangular slot II 36 after the winding motor II 37 is started.

Preferably, the L-shaped plates 45 are respectively disposed at two right-angle joints where the external vertical sections and horizontal sections of the airbags I 30 intersect with each other, so that the L-shaped plates 45 of the airbags I 30 can guide external portions of the airbags I 30 to quickly return to the U shape after being inflated. As a result, during the inflation process, the external portions of the airbags I 30 will not be pressed at the bottom of the base 1, ensuring that the airbags I 30 quickly and completely wrap the bottom and the two sides of the base 1, thereby improving the external surface areas of the airbags I 30 while ensuring sufficient buoyancy generated by the airbags I 30 to support the base 1.

Embodiment 4

Referring to FIGS. 6-8, based on the embodiment 3, since the drilling platform often switches between the land environment and the water environment, the rectangular slots I 29 and the rectangular slot II 36 may have wading conditions, and long-term immersion may cause corrosion and microorganism adhesion of the airbags I 30 or the airbag II 35, which is extremely easy to reduce the service life of the airbags. Therefore, the applicant designed two oppositely disposed cavities on the internal sidewalls of both the rectangular slots I 29 and the rectangular slot II 36, and the cavities are provided with the driving cylinders 41 therein; rectangular through holes are drilled on walls of the cavities to communicate with the rectangular slots I 29 or the rectangular slot II 36; the sealing plates 31 are arranged at the output ends of the driving cylinders 41. When the airbags are recovered, the driving cylinders 41 are turned on until opposite end faces of the two sealing plates 31 contact with each other to achieve closure of the bottom ends of the rectangular slots I 29 or the rectangular slot II 36. It should be further noted that the rectangular slots I 29 and the rectangular slot II 36 have identical depths, the only difference is that the width of the rectangular slot II 36 is larger than the width of the rectangular slots I 29. As a result, the inflating mechanisms corresponding to the airbags I 30 or the airbag II 35 are identical, and the bottom end closure mechanisms corresponding to the rectangular slots I 29 and the rectangular slot II 36 are also identical, each comprises two cavities, two driving cylinders 41, two rectangular through holes, and two sealing plates 31. Preferably, the two engaged protrusions 42 can increase the contact area of the two sealing plates 31, so as to better isolate the rectangular slots I 29 or the rectangular slot II 36 from the outside.

Preferably, when the base 1 is in a water environment, an immersion depth of the horizontal section of the airbag II 35 after being inflated and expanded is greater than immersion depths of the horizontal sections of the airbags I 30 after being inflated and expanded. When the drilling platform is placed above the water, a gravity center thereof is in the middle of the base 1. Therefore, as a main supporting member, a volume of the airbag II 35 should be larger than volumes of the airbags I 30. Furthermore, the height of the horizontal sections of the airbags I 30 after inflation and expansion is HI, the height of the horizontal section of the airbag II 35 after inflation and expansion is G, and H<G<2H, so that a floating area at the bottom of the base 1 is sufficient to meet the requirements of movement and drilling construction of the drilling platform.

The specific embodiments described above further explain the objectives, technical solutions and beneficial effects of the present invention. It is to be understood that the foregoing is only illustrative of specific embodiments of the present invention, and is not intended to limit the scope of the present invention. Any modifications, equivalent substitutions, improvements, etc., made within the spirit and scope of the present invention are intended to be included within the claimed scope of the present invention.

What is claimed is:

1. A drilling platform for amphibious operations, comprising: a base (1) and an operating platform (13) fixed on the base (1) for drilling, wherein drive tracks (12) are arranged on both sides of the base (1), a propeller is disposed at a rear end of the base (1), and a driving assembly is disposed inside the base (1) to respectively cooperate with the drive tracks (12) and the propeller; two support cylinders (4) are respectively disposed at two ends of the base (1), and bottom ends of the support cylinders (4) penetrate the base (1) to be flush with a bottom surface of the base (1); each of the support cylinders (4) contains a sub-cylinder (2) coaxial therewith; a bottom end of the sub-cylinder (2) is sealed, and a partition plate (201) for isolating the sub-cylinder (2) into two separate regions is mounted on an internal circumferential wall of the sub-cylinder (2); a pushing cylinder (202) is arranged on a bottom surface of the partition plate (201); a circular sealing organ cover (203) is arranged on the internal circumferential wall of the sub-cylinder (2), and a small-diameter open end of the sealing organ cover (203) is connected to a middle of an output end of the pushing cylinder (202); a follower plate (204) is mounted at an end portion of the output end of the pushing cylinder (202); a plurality of sliding slots (208) are provided on an external circumferential wall at a bottom end along a circumferential direction of the sub-cylinder (2), and a plurality of grooves (207) are formed on the internal circumferential wall of the bottom end along the circumferential direction of the sub-cylinder (2); longitudinal sections of the grooves (207) are right-angled triangles, and bottoms of the grooves (207) communicate with the sliding slots (208); a plurality of linkage rods (205) are fixed on a bottom surface of the follower plate (204), and a bottom of each of the linkage rods (205) is respectively hinged with an anchor claw (206); a bottom end of the anchor claw (206) extends downwardly along oblique sides of the grooves (207) into the sliding slots (208); when the output end of the pushing cylinder (202) extends to a maximum stroke, bottom ends of the linkage rods (205) are completely moved out of the sliding slots (208); while external sidewalls of the linkage rods (205) contact with the oblique sides of the grooves (207), the internal sidewalls of the linkage rods (205) contact with the internal walls of the sliding slots (208); a buoyancy adjustment assembly is provided at a bottom of the base (1), so as to provide buoyancy support for the base (1) when the base (1) is transferred from land to water.

2. The drilling platform, as recited in claim 1, wherein the driving assembly comprises four active motors (22), and the base (1) is internally provided with a plurality of support plates (21); one end of a power output shaft (20) movably penetrates a top of the support plate (21), and the other end of the power output shaft (20) movably penetrates a sidewall of the base (1) and is connected to a driving wheel of the drive track (12); an active wheel (19) is mounted on an output shaft of the active motor (22), and a driven wheel (17), which is connected to the active wheel (19) via a belt (18), is mounted on the power output shaft (20); two clapboards (25) are provided in a middle of the base (1), and an independent interval is formed and sealed between the two clapboards (25); the four active motors (22) are all disposed in the independent interval; the driving assembly further comprises two driving shafts (23), one ends of the driving shafts (23) are rotatably disposed in the base (1), and the other ends of the driving shafts (23) movably penetrate the base (1) and extend outwardly; a plurality of supports (16) are arranged on the internal wall at the bottom of the base (1), and an up-push cylinder is provided on each of the supports (16); an output end of the up-push cylinder is provided with a support base, and a driving motor (14) is horizontally disposed on the support base; a driving gear (15) is mounted at an output end of the driving motor (14), and linkage gears cooperating with the driving gear (15) are mounted on the driving shafts (23).

3. The drilling platform, as recited in claim 2, wherein a sleeve (24) is disposed in a middle of the operating platform (13) for a drill rod to pass through, the sleeve (24) penetrates the base (1) to be flush with the bottom of the base (1), and the sleeve (24) is placed in the independent interval formed by the two clapboards (25); a drill rod adjusting mechanism (5) is provided at a top of the sleeve (24), comprising a limiting cylinder and a fixing cylinder (505) coaxial with the limiting cylinder, wherein the fixing cylinder (505) is placed in the limiting cylinder, and two bearings are arranged on an internal circumferential wall of the fixing cylinder (505); a connecting rod penetrates the fixing cylinder (505) and cooperates with the two bearings; a drill rod joint (501) is fixed at one end of the connecting rod, and a transmission gear (506) is connected to the other end of the connecting rod; a fixing plate (502) is provided on an internal wall of the limiting cylinder, and an end plate (511) is disposed on an external circumferential wall of the limiting cylinder; an adjusting shaft (504) is disposed inside the limiting cylinder, an external circumferential wall of the adjusting shaft is respectively provided with a driven auxiliary gear (509) and a driven gear (510); an active gear (508) cooperating with the driven gear (510) is further provided inside the limiting cylinder; a toothed belt (507) is provided on an external circumferential wall of the fixing cylinder (505) along an axis thereof to cooperate with the driven auxiliary gear (509); a screw hole is drilled in a middle of the end plate (511), and a screw (512) penetrates the end plate (511) and extends into the limiting cylinder; a bearing is mounted on an extended end of the screw (512); a handle (513) is mounted on an external end of the screw (512); one end of the adjusting shaft (504) is connected to the bearing, and a spring (503) facing the fixing plate (502) is fixed on the other end of the adjusting shaft (504).

4. The drilling platform, as recited in claim 1, wherein the buoyancy adjusting assembly comprises two airbags I (30) and one airbag II (35), wherein two rectangular slots I (29) are respectively provided on both sides at the bottom of the base (1), and a rectangular slot II (36) is provided at a middle of the bottom of the base (1); the airbags I (30) are folded and placed in the rectangular slots I (29), and the airbag II (35) is folded and placed in the rectangular slot II (36); three inflating mechanisms are provided inside the base (1), each comprising a fan (26), a booster pump (27) and a gas pipe (28), wherein the booster pump (27) is disposed on the gas pipe (28), one end of the gas pipe (28) communicates with a gas outlet of the fan (26), and the other end of the gas pipe (28) is connected to the airbags I (30) after penetrate the base (1); the airbags I (30) are inflated and expanded into a U shape, and internal vertical sections of the airbags I (30) are placed in the rectangular slots I (29); a distance between a sidewall of the base (1) and the rectangular slots I (29) on a same side is L, a distance between the two vertical sections of the airbags I (30) is R, and R≥L; the airbag II (35) is inflated and expanded into a T shape, and a vertical section of the airbag II (35) is located in the rectangular slot II (36).

5. The drilling platform, as recited in claim 4, wherein a plurality of loops I (43) are provided on external surfaces of the airbags I (30), and a plurality of loops II (39) are provided on an external surface of the airbag II (35); a winding motor I (32) and a winding motor II (37) are provided inside the base (1); a winding roller I (33) and a winding roller II (34) are respectively arranged at an output end of the winding motor I (32); an external diameter of the winding roller II (34) is larger than an external diameter of the winding roller I (33); a winding roller III (38) is provided at an output end of the winding motor II (37), and one traction rope I (44) is connected to the winding roller II (34) after passing through all the loops I (43) on external sidewalls of the airbags I (30), and another traction rope I (44) is connected to the winding roller I (33) after passing through all the loops I (43) on an internal sidewall of the airbags I (30); a traction rope II (40) is connected to the winding roller III (38) after passing through the loops II (39).

6. The drilling platform, as recited in claim 4, wherein L-shaped plates (45) are respectively disposed at two right-angle joints where external vertical sections and horizontal sections of the airbags I (30) intersect with each other, and the L-shaped plates (45) are made of an elastic rubber material.

7. The drilling platform, as recited in claim 4, wherein two oppositely disposed cavities are formed on internal sidewalls of the rectangular slots I (29) and the rectangular slot II (36), and the cavities are provided with driving cylinders (41) therein; rectangular through holes are drilled on walls of the cavities to communicate with the rectangular slots I (29); sealing plates (31) are arranged at output ends of the driving cylinders (41), wherein the driving cylinders (41) are turned on until opposite end faces of the two sealing plates (31) contact with each other to achieve closure of the bottom ends of the rectangular slots I (29).

8. The drilling platform, as recited in claim 7, wherein among the rectangular slots I (29), two protrusions (42) are respectively provided on the opposite end faces of the two sealing plates (31), and the two protrusions (42) are fitted to each other.

9. The drilling platform, as recited in claim 4, wherein a height of the horizontal sections of the airbags I (30) after inflation and expansion is H, a height of a horizontal section of the airbag II (35) after inflation and expansion is G, and H<G<2H.

10. The drilling platform, as recited in claim 5, wherein a height of the horizontal sections of the airbags I (30) after inflation and expansion is H, a height of a horizontal section of the airbag II (35) after inflation and expansion is G, and H<G<2H.

11. The drilling platform, as recited in claim 6, wherein a height of the horizontal sections of the airbags I (30) after inflation and expansion is H, a height of a horizontal section of the airbag II (35) after inflation and expansion is G, and H<G<2H.

12. The drilling platform, as recited in claim 7, wherein a height of the horizontal sections of the airbags I (30) after inflation and expansion is H, a height of a horizontal section of the airbag II (35) after inflation and expansion is G, and H<G<2H.

13. The drilling platform, as recited in claim 8, wherein a height of the horizontal sections of the airbags I (30) after inflation and expansion is H, a height of a horizontal section of the airbag II (35) after inflation and expansion is G, and H<G<2H.

14. The drilling platform, as recited in claim 1, wherein a drilling rig (6), a control room (7), a sleeve bracket (8), a drill joint bracket (9), a drill joint bracket (10), a boom (11) and two hangers (3) are disposed on the operating platform (13), wherein the drilling rig (6) is located in a middle of the operating platform (13), and the two hangers (3) are respectively located at two ends of the operating platform (13).

* * * * *